(12) United States Patent
Kieffel et al.

(10) Patent No.: US 9,837,801 B2
(45) Date of Patent: Dec. 5, 2017

(54) GAS-INSULATED MEDIUM OR HIGH-VOLTAGE ELECTRICAL APPARATUS INCLUDING CARBON DIOXIDE, OXYGEN, AND HEPTAFLUORO-ISOBUTYRONITRILE

(71) Applicant: Alstom Technology Ltd., Baden (CH)

(72) Inventors: Yannick Kieffel, Saint Jean de Bournay (FR); Alain Girodet, Chassieu (FR); Christophe Creusot, Pizay (FR); Jacques Porte, Lyons (FR)

(73) Assignee: ALSTOM TECHNOLOGY LTD, Baden (CH)

( * ) Notice: Subject to any disclaimer, the term of this patent is extended or adjusted under 35 U.S.C. 154(b) by 0 days.

(21) Appl. No.: 15/023,225

(22) PCT Filed: Sep. 17, 2014

(86) PCT No.: PCT/EP2014/069816
§ 371 (c)(1),
(2) Date: Mar. 18, 2016

(87) PCT Pub. No.: WO2015/040069
PCT Pub. Date: Mar. 26, 2015

(65) Prior Publication Data
US 2016/0241004 A1    Aug. 18, 2016

(30) Foreign Application Priority Data

Sep. 20, 2013 (FR) ...................... 13 59073

(51) Int. Cl.
*H02B 13/055* (2006.01)
*H01B 3/56* (2006.01)
*H01F 38/20* (2006.01)

(52) U.S. Cl.
CPC ............. *H02B 13/055* (2013.01); *H01B 3/56* (2013.01); *H01F 38/20* (2013.01)

(58) Field of Classification Search
None
See application file for complete search history.

(56) References Cited

U.S. PATENT DOCUMENTS 3,048,648 A    8/1962  Plump
4,547,316 A   10/1985  Yamauchi
(Continued)

FOREIGN PATENT DOCUMENTS

EP    0 128 588 A1   12/1984
EP    0 131 922 A1    1/1985
(Continued)

OTHER PUBLICATIONS

French Search Report issued in Application No. FR 13 59073 dated Jun. 26, 2014.
(Continued)

*Primary Examiner* — Necholus Ogden, Jr.
(74) *Attorney, Agent, or Firm* — Pearne & Gordon LLP (57) ABSTRACT

The present invention provides medium- or high-voltage equipment including a leaktight enclosure in which there are located electrical components and a gas mixture for providing electrical insulation and/or for extinguishing electric arcs that are likely to occur in said enclosure, the gas mixture comprising heptafluoroisobutyronitrile, carbon dioxide, and oxygen in small quantities. Electrical components covered in a solid dielectric layer of varying thickness are located inside said leaktight enclosure of the equipment of the invention.

15 Claims, 4 Drawing Sheets

(56) References Cited

U.S. PATENT DOCUMENTS

| | | |
|---|---|---|
| 2008/0135817 A1 | 6/2008 | Luly |
| 2013/0292614 A1 | 11/2013 | Tuma et al. |
| 2014/0190726 A1 | 7/2014 | Kieffel |
| 2014/0196932 A1 | 7/2014 | Kieffel |
| 2014/0233159 A1 | 8/2014 | Kieffel |
| 2015/0083979 A1* | 3/2015 | Costello .................. H01B 3/24 252/571 |
| 2015/0228375 A1 | 8/2015 | Kieffel |

FOREIGN PATENT DOCUMENTS

| | | |
|---|---|---|
| EP | 1 724 802 A2 | 11/2006 |
| FR | 1 265 731 A | 5/1961 |
| FR | 2 977 707 A1 | 1/2013 |
| FR | 2 983 340 A1 | 5/2013 |
| WO | 2008/073790 A2 | 6/2008 |
| WO | 2011090992 A1 | 7/2011 |
| WO | 2012/080246 A1 | 6/2012 |
| WO | 2013/041697 A1 | 3/2013 |

OTHER PUBLICATIONS

International Search Report issued in Application No. PCT/EP2014/069816 dated Dec. 10, 2014.
Written Opinion issued in Application No. PCT/EP2014/069816 dated Dec. 10, 2014.

* cited by examiner

GAS-INSULATED MEDIUM OR HIGH-VOLTAGE ELECTRICAL APPARATUS INCLUDING CARBON DIOXIDE, OXYGEN, AND HEPTAFLUORO-ISOBUTYRONITRILE

TECHNICAL FIELD

The invention relates to the field of electrical insulation and electric arc extinction in medium- or high-voltage equipment, in particular in high-voltage equipment.

More particularly, the present invention relates to the use of hybrid insulation having low environmental impact in high-voltage equipment based on a gaseous medium comprising heptafluoroisobutyronitrile and a mixture of particular neutral gases, namely, a mixture of carbon dioxide and oxygen used as gas for electrical insulation and/or for electric arc extinction.

This insulation based on a ternary gas mixture may possibly be combined with solid insulation of low dielectric permittivity applied in a layer of small or large thickness on the conductive parts subjected to an electric field that is greater than the breakdown field of the system without solid insulation. Since the thickness of the insulating layer is a function of the utilization factor of the electric field, $\eta$, defined as the ratio of the mean electric field (U/d) divided by the maximum electric field Emax ($\eta=U/(Emax*d)$), the layer is thick for utilization factors close to 0.3, while it is thin for utilization factors approaching 0.9.

The invention also relates to high-voltage equipment in which electric arc extinction is performed by a gaseous medium comprising carbon dioxide, oxygen, and heptafluoro-isobutyronitrile, and electrical insulation is provided by the same gas optionally in combination with solid insulation of low dielectric permittivity applied in a layer of small or large thickness on the conductive parts subjected to an electric field that is greater than the breakdown field of the system without solid insulation. This equipment may in particular be an electrical transformer such as a power or measurement transformer, a gas-insulated transmission line (GIL) for transporting or distributing electricity, a set of busbars, or even electrical connector/disconnectors (also called switchgear), such as a circuit breaker, a switch, a unit combining a switch with fuses, a disconnector, a grounding switch, or a contactor.

PRIOR ART

In medium- or high-voltage substation equipment, electrical insulation and, if necessary, electric arc extinction are typically performed by a gas that is confined to the inside of said equipment.

Currently, the gas most often used in that type of equipment is sulfur hexafluoride ($SF_6$). That gas presents dielectric strength that is relatively high, good thermal conductivity, and low dielectric losses. It is chemically inert, non-toxic for humans and animals and, after being dissociated by an electric arc, it recombines quickly and almost completely. In addition, it is non-flammable and its price is still moderate.

However, $SF_6$ has the main drawback of presenting a global warming potential (GWP) of 22,200, (relative to $CO_2$ over 100 years) and remains in the atmosphere for a time period of 3200 years, and this places it among gases having strong global warming power. $SF_6$ was therefore included in the Kyoto protocol (1997) in the list of gases for which emissions need to be limited.

The best way to limit $SF_6$ emissions consists in limiting the use of said gas, and this has led manufacturers to look for alternatives to $SF_6$.

So called "simple" gases such as air or nitrogen, that do not have a negative impact on the environment, present dielectric strength that is much lower than that of $SF_6$. Thus, for example, the alternating current (AC) (50 Hz) dielectric strengths of air and of nitrogen are substantially one-third that of $SF_6$.

As a result, the use of those "simple" gases for electrical insulation and/or electric arc extinction in substation equipment would require drastically increasing the volume and/or the filling pressure of said equipment, which goes against efforts that have been made over the past few decades to develop equipment that is compact and safe for personnel, and less and less bulky.

Mixtures of $SF_6$ and nitrogen are used in order to limit the impact of $SF_6$ on the environment. The addition of $SF_6$ at 10% to 20% by volume makes it possible to significantly improve the dielectric strength of nitrogen.

Nevertheless, as a result of the high GWP of $SF_6$, the GWP of those mixtures remains very high. Thus, for example, a mixture of $SF_6$ and nitrogen having a volume ratio of 10/90, presents an AC (50 Hz) dielectric strength that is equal to 59% of that of $SF_6$, but its GWP is 8650.

Such mixtures should therefore not be considered to be gases having low environmental impact.

The same applies for mixtures described in the European patent application having publication number 0 131 922, [1], and comprising about 60 to 99.5 molar percent $SF_6$ and about 0.5 to 40 molar percent of a saturated fluorocarbon, and selected in particular from $C_2F_5CN$, $CBrClF_2$, and $c$-$C_4F_8$.

Perfluorocarbons ($C_nF_{2n+2}$ and $c$-$C_4F_8$) generally present advantageous dielectric strength properties but have GWPs typically in a range going from 5000 to 10,000 (6500 for $CF_4$, 7000 for $C_3F_8$ and $C_4F_{10}$, 8700 for $c$-$C_4F_8$, and 9200 for $C_2F_6$).

It should be noted that U.S. Pat. No. 4,547,316, [2], aims to provide an insulating gas mixture for electric devices that also presents considerable insulating properties and moderate toxicity for humans and animals, compared with $C_2F_5CN$. Thus, the proposed gas mixture comprises $C_2F_5CN$ and an alkyl nitrite more particularly selected from the group consisting of methyl nitrite, ethyl nitrite, propyl nitrite, butyl nitrite, and amyl nitrite. In addition, such a mixture may include $SF_6$. However, little information regarding the insulating properties of that mixture is provided.

International application WO 2008/073790, [3], describes the numerous other dielectric gases that are for use in the field of electrical insulation and of electric arc extinction in medium- or high-voltage equipment.

There exist other promising alternatives from a GWP and electric characteristics point of view, such as trifluoroiodomethane ($CF_3I$). $CF_3I$ presents dielectric strength that is greater than that of $SF_6$ and this applies both to uniform fields and non-uniform fields, for a GWP that is less than 5 and a time period spent in the atmosphere of 0.005 year. Unfortunately, in addition to the fact that $CF_3I$ is expensive, it has an average occupational exposure limit (OEL) lying in the range 3 to 4 parts per million (ppm) and is classified among carcinogenic, mutagenic, and reprotoxic (CMR) category 3 substances, which is unacceptable for use on an industrial scale.

International application WO 2012/080246, [4], describes the use of one (or more) fluoroketone(s) in a mixture with air as electrical insulation and/or electric arc extinction means having low environmental impact. Because of the high boiling points for the fluids proposed, i.e. 49° C. for fluoroketone C6 and 23° C. for fluoroketone C5, those fluids are found in the liquid state at the usual minimum pressures and service temperatures for medium- and high-voltage equipment, thus obliging the inventors to add systems for vaporizing the liquid phase or for external heating of the equipment so as to maintain the temperature of the equipment above the liquefaction temperature for fluoroketones. That external vaporizing system and in particular heating system complicates the design of the equipment, reduces its reliability in the event of its power supply being cut off, and gives rise to additional electricity consumption that may reach one hundred megawatt hours (MWh) over the lifetime of the equipment, which goes against the aim of reducing the environmental impact of the equipment and in particular, reducing carbon emissions. From a point of view of reliability at low temperature, in the event of the power supply being cut off at low temperature, the gaseous phase of the fluoroketone(s) liquefies, thereby considerably lowering the concentration of fluoroketone(s) in the gas mixture and thus reducing the insulating power of the equipment, which equipment is then incapable of withstanding the voltage in the event of the power supply being restored.

It has also been proposed to use hybrid insulation systems associating gas insulation, e.g. dry air, nitrogen, or $CO_2$, with solid insulation. As described in the European patent application having publication number 1 724 802, [5], that solid insulation consists, for example, in covering the live parts presenting a strong electric field gradient with resin of the epoxy resin type or similar, which makes it possible to reduce the field to which the live parts are subjected.

However, the insulation thus obtained is not equivalent to the insulation provided by $SF_6$ and the use of those hybrid systems requires the volume of equipment to be increased relative to the volume made possible with $SF_6$ insulation.

Various solutions exist for extinguishing an electric arc without $SF_6$: extinguishing in oil, extinguishing in ambient air, extinguishing using a vacuum circuit-breaker. However, equipment that extinguishes in oil presents the major drawback of exploding in the event of failing to extinguish or of internal failure. Equipment in which electric arcs are extinguished in ambient air is generally of large dimensions, costly, and sensitive to the environment (moisture, pollution), whereas equipment, in particular of the switch-disconnector type, having a vacuum circuit breaker is very expensive and, as a result, is not very common on the market in the field of voltages higher than 72.5 kV.

In view of the above, the inventors have therefore generally sought to find an alternative to $SF_6$, that has low environmental impact relative to identical $SF_6$ equipment, while maintaining the characteristics of the equipment, from the point of view of its insulating and extinguishing abilities, close to those of $SF_6$, and without significantly increasing the size of the equipment or the pressure of the gas inside it.

In addition, the inventors have sought to maintain the service temperature ranges of the equipment close to those of equivalent $SF_6$ equipment, and to do so without external heater means.

More specifically, the inventors have sought to find an insulation system comprising at least a gas or a mixture of gases that, while presenting electrical insulation or electric arc extinction properties that are sufficient for application in the field of high-voltage equipment and that are in particular comparable to $SF_6$ equipment, also has an impact on the environment that is low or zero.

The inventors have also sought to provide an insulation system, and in particular the gas or mixture of gases included in said system, that is non-toxic for humans and animals.

They have further sought to provide an insulation system, and in particular the gas or mixture of gases included in said system, having a manufacture or purchase cost that is compatible with use on an industrial scale.

They have further sought to provide medium- or high-voltage equipment based on said insulation system, and in particular the gas or mixture of gases included in said system, having a size and pressure that are close to those of equivalent equipment insulated with $SF_6$ and that does not present liquefaction at the minimum utilization temperature without the addition of an external heat source.

DESCRIPTION OF THE INVENTION

These objects and others are achieved by the invention that proposes the use of a particular gas mixture, possibly combined with a solid insulation system making it possible to obtain medium- or high-voltage equipment having low environmental impact.

Thus, the insulation system implemented in the context of the present invention is based on a gaseous medium comprising heptafluoroisobutyronitrile in a mixture with carbon dioxide and oxygen for use as a gas for electrical insulation and/or for electric arc extinction in medium- or high-voltage equipment.

In general, the present invention provides medium- or high-voltage equipment including a leaktight enclosure in which there are located electrical components and a gas mixture for providing electrical insulation and/or for extinguishing electric arcs that are likely to occur in said enclosure, the gas mixture comprising heptafluoroisobutyronitrile, carbon dioxide, and oxygen in small quantity.

In the equipment of the invention, the gas insulation implements a gas mixture including heptafluoroisobutyronitrile, carbon dioxide, and oxygen in small quantity.

The heptafluoroisobutyronitrile of formula (I):

$$(CF_3)_2CFCN \tag{I}$$

referred to below as $i-C_3F_7CN$, corresponds to 2,3,3,3-tetrafluoro-2-trifluoromethyl propanenitrile, having CAS number: 42532-60-5, presenting a boiling point of −3.9° C. at 1013 hPa (boiling point measured in accordance with ASTM D1120-94 "Standard Test Method for Boiling Point of Engine Coolants").

The relative dielectric strength of heptafluoro-isobutyronitrile having formula (I), that is normalized relative to $N_2$ and compared to that of the various gases used and to that of $SF_6$ is given in Table I below, said dielectric strength being measured at atmospheric pressure, at a DC voltage, between two steel electrodes having a diameter of 2.54 cm and spaced apart by 0.1 cm.

TABLE I

| $N_2$ | $CO_2$ | $O_2$ | $SF_6$ | $i-C_3F_7CN$ |
|---|---|---|---|---|
| 1.0 | 0.88 | 1.0 | 2.5 | 5.5 |

Table II below shows the relative dielectric strength of various gases studied, that are normalized relative to the gas that it is desired to replace. i.e. $SF_6$.

TABLE II

| SF₆ | N₂ | CO₂ | O₂ | C₃F₇CN |
|-----|-----|------|------|---------|
| 1.0 | 0.4 | 0.35 | 0.4 | 2.2 |

Thus, heptafluoroisobutyronitrile having the formula (I) as described above, that is non-toxic, non-corrosive, non-flammable, and that presents a GWP that is low relative to that of $SF_6$, is endowed with electrical insulation or electric arc extinction properties suitable for enabling it to replace $SF_6$ as an insulation gas and/or arc-extinction gas in medium- or high-voltage equipment, in combination with a dilution gas.

More particularly, the present invention provides gas insulation having low environmental impact combining a gas mixture having an environmental impact that is low (low GWP relative to $SF_6$), that is compatible with minimum utilization temperatures of the equipment, and that has extinguishing and thermal dissipation dielectric properties that are better than those of conventional gases such as $CO_2$, air, or nitrogen.

Above and below, the terms "medium voltage" and "high voltage" are used in the conventionally accepted manner, i.e. the term "medium voltage" refers to a voltage that is greater than 1000 volts (V) for AC and 1500 V for DC, but that does not exceed 52,000 V for AC or 75,000 V for DC, whereas the term "high voltage" refers to a voltage that is strictly greater than 52,000 V for AC and than 75,000 V for DC.

In the context of the invention, heptafluoro-isobutyronitrile having the formula (I) as defined above is used in a mixture with a particular dilution gas that meets the following four criteria:

(1) presenting a very low boiling temperature, lower than the minimum utilization temperature of the equipment;

(2) presenting dielectric strength that is greater than or equal to that of carbon dioxide in test conditions that are identical to those used for measuring the dielectric strength of said carbon dioxide (i.e. same equipment, same geometrical configuration, same operating parameters, . . . );

(3) being free from toxicity for humans and animals; and (4) presenting a GWP that is lower than that of heptafluoroisobutyronitrile so that diluting heptafluoro-isobutyronitrile with the dilution gas also has the effect of lowering the environmental impact of heptafluoro-isobutyronitrile, since the GWP of a gas mixture is a weighted average derived from the sum of the fractions by weight of each of the substances making it up multiplied by the corresponding GWPs.

The dilution gases usually used are neutral gases having a GWP that is very low, or even zero. Also, the dilution gas is, typically, carbon dioxide, which has a GWP that is equal to 1.

In the context of the present invention, the inventors have found that adding a few percent of oxygen ($O_2$, GWP=0) to the mixture (heptafluoroisobutyronitrile+carbon dioxide) makes it possible to obtain synergy in the insulation properties of the gas mixture as a whole (cf. Table VII below).

In addition, the ternary gas mixture implemented in context of the present invention improves both (i) electrical insulation making it possible to conserve existing tanks in the compartments operating with $SF_6$ and (ii) extinction performance, in particular for circuit-breaker and grounding disconnector compartments.

In the context of the present invention, oxygen is used in small quantity. In the context of the present invention "small quantity" indicates that the oxygen in the gas mixture comprising heptafluoroisobutyronitrile, carbon dioxide, and oxygen presents a molar percentage lying in the range 1% and 25%, in particular in the range 2% to 15% and specifically in the range 2% to 10%.

In addition, the above-defined heptafluoroisobutyronitrile in the gas mixture comprising heptafluoroisobutyronitrile, carbon dioxide, and oxygen is present at a molar percentage ($M_{he}$) that is not less than 80% of the molar percentage M, determined by the formula (II):

$$M = P_{he}/P_{mixture}) \times 100 \quad (II)$$

in which $P_{mixture}$ represents the total pressure of the mixture at 20° C. in the equipment and $P_{he}$ represents the partial pressure, expressed in the same units, that is equivalent at 20° C. to the saturated vapor pressure presented by above-defined heptafluoro-isobutyronitrile at the minimum utilization temperature of the equipment.

As for the pressure $P_{he}$, it is approximated by the formula (III):

$$P_{he} = (SVP_{he} \times 293)/(T_{min} + 273) \quad (III)$$

in which $SVP_{he}$ represents the saturated vapor pressure of heptafluoroisobutyronitrile as defined above at the minimum utilization temperature $T_{min}$ of the equipment, expressed in degrees Celsius.

Thus, the dielectric properties of the gaseous medium are the highest possible and are close to those of $SF_6$.

Advantageously, in the context of the present invention, the minimum utilization temperature $T_{min}$ is selected from 0° C., −5° C., −10° C., −15° C., −20° C., −25° C., −30° C., −35° C., −40° C., −45° C., and −50° C., and, in particular, selected from 0° C., −5° C., −10° C., −15° C., −20° C., −25° C., −30° C., −35° C., and −40° C.

In a first embodiment, the equipment is medium-voltage or high-voltage equipment in which having some of the mixture in the liquid state does not reduce insulation. In this event, it is possible to use a mixture in which the heptafluoro-isobutyronitrile is present at a molar percentage $M_{he}$, greater than the molar percentage M. The molar percentage of the heptafluoroisobutyronitrile then typically lies in the range 95% to 130%, better still in the range 97% to 120%, ideally in the range 99% to 110% of the molar percentage M as defined above. Under such circumstances, the dielectric strength of the equipment should be tested with heptafluoroisobutyronitrile in the gas mixture at a partial pressure for which the gas does not present liquefaction at the minimum service temperature so that the dielectric strength of said equipment is validated across the whole of its temperature range.

In a second embodiment, the equipment is medium- or high-voltage equipment in which insulation can be affected by the presence of a liquid phase. In this embodiment, it is desirable for the heptafluoroisobutyronitrile/dilution gas mixture to be exclusively or almost exclusively in the gaseous state across the entire range of utilization temperatures for the equipment. It is therefore advantageous for the heptafluoroisobutyronitrile to be present in the mixture at a molar percentage ($M_{he}$) that does not exceed 100% of the molar percentage M so that it does not present a liquefaction phase at the minimum utilization temperature. Under such circumstances, the molar percentage of heptafluoroisobutyronitrile advantageously lies in the range 95% to 100% and, in particular, in the range 98% to 100% of the molar percentage M as defined above.

Also advantageously, the gas mixture comprises only heptafluoroisobutyronitrile, carbon dioxide, and oxygen, in proportions as defined above. In other words, the gas mixture is constituted by heptafluoroisobutyronitrile, by carbon dioxide, and by oxygen, in proportions as described above.

In order to improve overall dielectric strength, in a hybrid insulation system, the gas mixture comprising heptafluoroisobutyronitrile, carbon dioxide, and oxygen is used in combination with solid insulation, in particular of low dielectric permittivity, that is applied as an insulating layer of varying thickness on the conductive parts that are subjected to an electric field that is greater than the breakdown field of the medium- or high-voltage equipment without the solid insulation.

In fact, the medium- or high-voltage equipment of the invention presents some electrical components that are not covered in a solid dielectric layer.

In other words, electrical components covered in a solid dielectric layer of varying thickness are located inside the leaktight enclosure of the medium- or high-voltage equipment of the present invention.

The dielectric/insulating layer implemented in the invention presents low relative permittivity. "Low relative permittivity" refers to relative permittivity that is less than or equal to 6. It should be recalled that the relative permittivity of a material, also known as its dielectric constant, and written $\in_r$, is a dimensionless quantity that may be defined by the formulae (IV) and (V) below:

$$\in_r = \in/\in_0 \tag{IV}$$

with $$\in = (e*C)/S \text{ and } \in_0 = 1/36\pi*10^9) \tag{V}$$

in which:
- $\in$ corresponds to the absolute permittivity of the material (expressed in farads per meter (F/m));
- $\in_0$ corresponds to the vacuum permittivity (expressed in F/m);
- C corresponds to the capacitance (expressed in farads (F)) of a plane capacitor comprising two parallel electrodes having placed between them a layer of material of permittivity that is to be determined, said layer representing a test piece;
- e corresponds to the distance (expressed in meters (m)) between the two parallel electrodes of the plane capacitor, which in this instance corresponds to the thickness of the test piece; and
- S corresponds to the area (expressed in square meters ($m^2$)) of each electrode constituting the plane capacitor.

In the context of the present invention, the capacitance is determined as in IEC standard 60250-ed1.0, i.e. by using a capacitor comprising two circular electrodes of diameter lying in the range 50 to 54 mm, secured to the test piece constituted by the material, said electrodes being obtained by spraying a conductive paint with a guard device. The test piece presents dimensions of 100 mm×100 mm and a thickness of 3 mm. The distance between the electrodes of the capacitor that corresponds to the above-mentioned magnitude e, is therefore 3 mm.

In addition, the capacitance is determined using an excitation level of 500 volts root mean square (V rms), at a frequency of 50 hertz (Hz), at a temperature of 23° C., and at relative humidity of 50%. The above-mentioned voltage is applied for a duration of 1 min.

"Insulating/dielectric layer of varying thickness" indicates in the context of the present invention that the dielectric material, deposited or applied on the electrical components or conductive parts, presents thickness that varies as a function of the conductive part or conductive part portion on which it is deposited. The thickness of the layer does not vary while the equipment is in use but is determined during preparation of the elements constituting the equipment.

In the context of the invention, the insulating layer is applied in a layer of small or large thickness on the conductive parts subjected to an electric field that is greater than the breakdown field of the system without solid insulation.

More particularly, since the thickness of the insulating layer implemented in the context of the present invention is a function of the utilization factor of the electrical field, η, defined as the ratio of the mean electric field (U/d) divided by the maximum electric field Emax ($\eta = U/(Emax*d)$), the layer is thick for utilization factors close to 0.3, i.e. lying in the range 0.2 to 0.4 and the layer is thin for utilization factors approaching 0.9, i.e. greater than 0.5, and in particular greater than 0.6.

Figure 4:
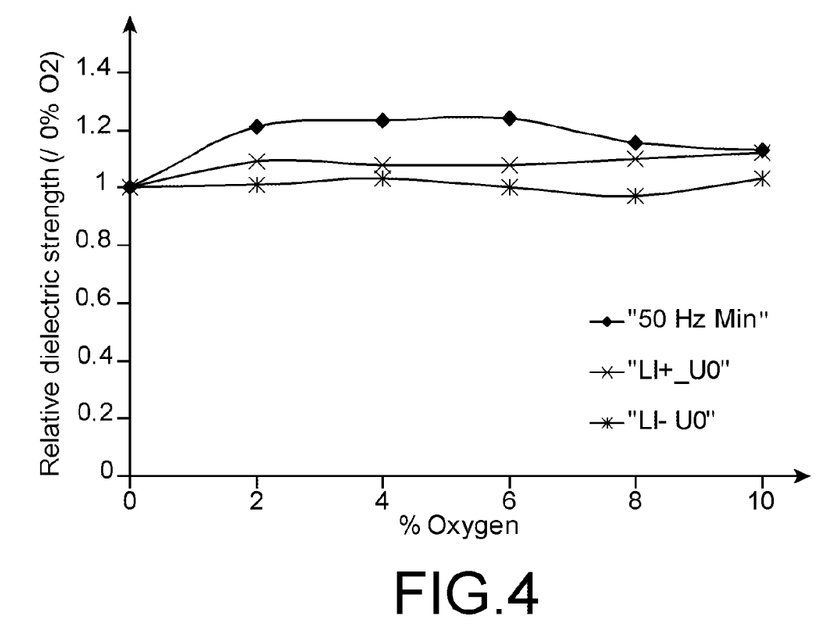
FIG. 4 shows, as a function of oxygen content, the relative dielectric strength of mixtures comprising heptafluoroisobutyronitrile, carbon dioxide, and oxygen compared with a mixture comprising heptafluoroisobutyronitrile and carbon dioxide only, for an application temperature of −30° C.

With reference to FIG. 4, the thick layers (6) are typically deposited on the electrodes (5) at positions in which the utilization factor of the electric field is close to 0.3 and the thin layers (7) on the conductors (1) at positions in which the utilization factor of the electric field is greater than 0.6.

In the context of the present invention, "thick layer" refers to a layer of thickness that is greater than 1 mm and less than 10 mm and "thin layer" refers to a layer of thickness that is less than 1 mm, advantageously less than 500 μm, in particular lying in the range 60 μm to 100 μm.

The solid insulating layer implemented in the context of the present invention may comprise a single dielectric material or a plurality of different dielectric materials. In addition, the composition of the insulating layer, i.e. the nature of the dielectric material(s) that the layer comprises may differ as a function of the conductive part or the portion of conductive part on which the solid insulating layer is deposited.

In particular, in the context of the invention, the materials selected to make the thick insulating layers present low relative permittivities, i.e. less than or equal to 6. In a particular implementation, the dielectric permittivities of the insulating materials used to make the thick, solid layers present relative permittivities of the order of 3, or less, i.e. relative permittivities that are less than or equal to 4 and in particular less than or equal to 3. By way of example of materials suitable for use in making the thick solid dielectric layers in equipment of the invention, mention may be made of polytetrafluoroethylene, polyimide, polyethylene, polypropylene, polystyrene, polycarbonate, polymethyl methacrylate, polysulfone, polyetherimide, polyether ether ketone, parylene N™, Nuflon™, silicone, and epoxy resin.

The materials selected in the invention for making the thin layers present relative permittivities of the order of 3, i.e. lying in the range 2 and 4 and in particular in the range 2.5 to 3.5. By way of example of materials suitable for use in making the thin solid dielectric layers in equipment of the invention, mention may be made of polytetrafluoroethylene, polyimide, polyethylene, polypropylene, polystyrene, polyamide, ethylene-monochlorotrifluoroethylene, parylene N™, Nuflon™, HALAR™, and HALAR C™.

In accordance with the invention, the equipment may be, firstly, a gas-insulated electrical transformer, e.g. a power transformer or a measurement transformer.

It may also be an overhead or buried gas-insulated line, or a set of busbars for transporting or distributing electricity.

There may also be an element for connection to the other equipment in the network, e.g. overhead lines or bulkhead connectors.

Finally, the equipment may also be a connector/disconnector (also called switchgear) such as, for example, a circuit breaker, such as a circuit breaker of the "dead tank" type, a "puffer", or "self blast"-type circuit breaker, a puffer-type circuit breaker having double motion arcing contacts, a thermal-effect puffer-type circuit breaker having single motion arcing contacts, a thermal-effect puffer-type circuit breaker having partial movement of the contact pin, a switch, a disconnector, such as air-insulated switchgear (AIS) or gas-insulated switchgear (GIS), a unit combining a switch with fuses, a grounding switch, or a contactor.

Figure 1:
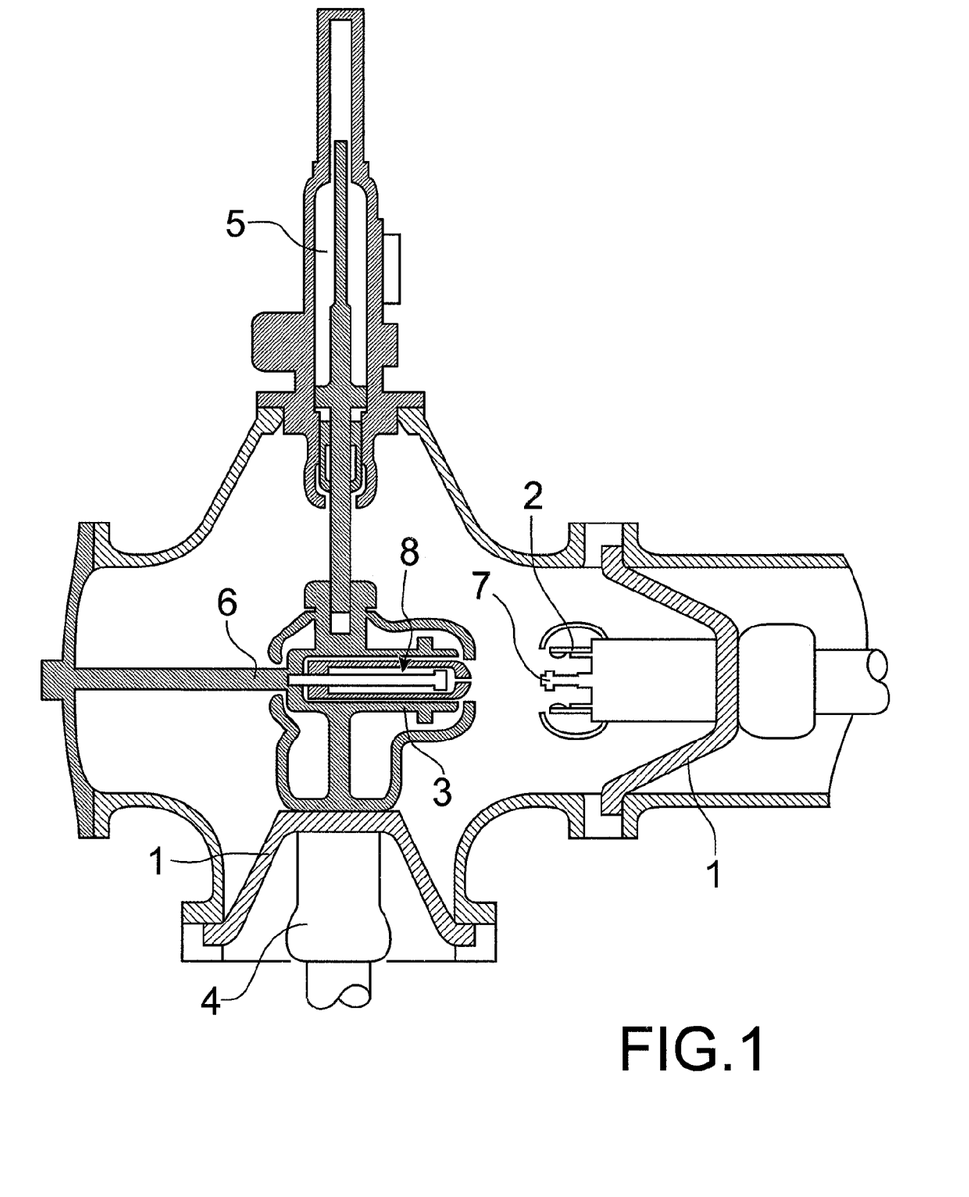
FIG. 1 is a longitudinal section view of a GIS type disconnector.

FIG. 1 shows a GIS-type disconnector that is well known by the person skilled in the art with grounding contacts and disconnector contacts and including an insulation cone (1), two permanent contacts (2 and 3), a cone electrode (4), a grounding operating rod (5), an insulating rod (6), a stationary arcing contact (7) and a contact tube (8).

Figure 2:
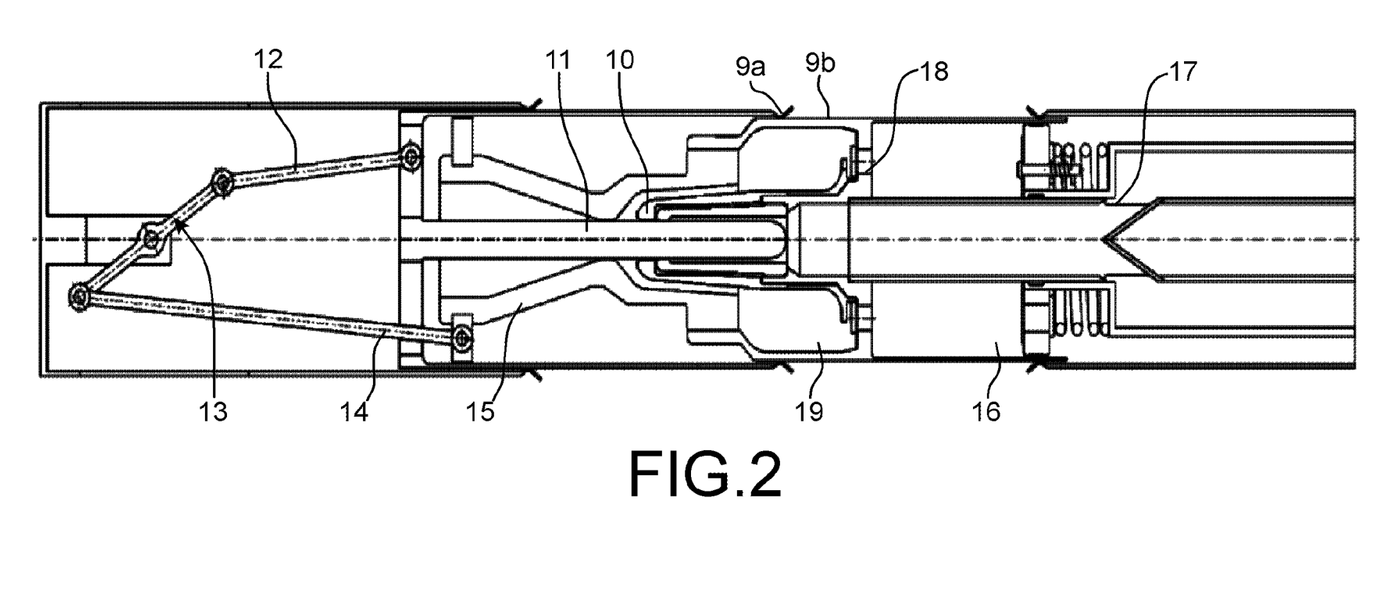
FIG. 2 is a longitudinal section view of an arc-control chamber of a puffer-type circuit breaker having dual motion arcing contacts.

Similarly, FIG. 2 shows an arc-control chamber having permanent contacts 9a, 9b and two movable arcing contacts, i.e. both a thimble or tulip-shaped contact 10, and a pin-shaped contact 11. This arc-control chamber is called a "double motion" chamber because the two arcing contacts 10, 11 are connected together by coupling means 12, 13, and 14 so as to be capable of being moved simultaneously in opposite directions. The first lever 14 is fastened to the movable blast nozzle 15 and transmits movement in the opposite direction, via the second lever, which constitutes the return lever 13 for the third lever 12. During opening, the gas present in the compression volume 16 is compressed by the blast piston 17 that is secured to the tulip-shaped arcing contact 10 and to the permanent contact 9b, and is blown by the valve 18 towards the blast volume 19 and then contributes to extinguishing the electric arc.

The present invention also provides the use of a gas mixture comprising heptafluoroisobutyronitrile, carbon dioxide, and oxygen in small quantities as a gas for electrical insulation and/or for electric arc extinction in medium- or high-voltage equipment, in which electrical components may further be covered with a solid insulating layer of varying thickness as defined above.

Other characteristics and advantages of the invention can be seen more clearly from the additional description below, given by way of illustrative and non-limiting example, and with reference to the accompanying figures.

DETAILED DESCRIPTION OF PARTICULAR EMBODIMENTS

The invention is based on the use of a gas mixture having low environmental impact, combining heptafluoroisobutyronitrile as described above, at least one dilution gas, also called neutral gas or buffer gas, constituted by carbon dioxide, and oxygen.

In the present invention, the expressions "dilution gas", "neutral gas", or "buffer gas" are equivalent and may be used interchangeably.

Advantageously, heptafluoroisobutyronitrile is present in the equipment in entirely gaseous form whatever the utilization temperature of the equipment. It is therefore advisable for the pressure of the heptafluoroisobutyronitrile inside the equipment to be selected as a function of the saturated vapor pressure (SVP) presented by heptafluoroisobutyronitrile at the lowest utilization temperature of said equipment.

However, since the equipment is usually filled with gas while at ambient temperature, the reference pressure of the heptafluoroisobutyronitrile used while filling the equipment is the pressure that corresponds to the SVP presented by heptafluoroisobutyronitrile at the lowest utilization temperature of said equipment, as raised to the filling temperature, e.g. 20° C.

By way of example, the Table III below gives the saturated vapor pressures, referenced $SVP_{i-C3F7CN}$ and expressed in hectopascals, presented by heptafluoroisobutyronitrile at temperatures of 0° C., −5° C., −10° C., −15° C., −20° C., −25° C., −30° C., and −40° C., as well as the pressures, referenced $P_{i-C3F7CN}$ and expressed in hectopascals, which correspond to those saturated vapor pressures raised to 20° C.

TABLE III

| saturated vapor pressure of $i\text{-}C_3F_7CN$ | | |
|---|---|---|
| Temperatures | $SVP_{i-C3F7CN}$ (hPa) | $P_{i-C3F7CN}$ (hPa) |
| 0° C. | 1177 | 1264 |
| −5° C. | 968 | 1058 |
| −10° C. | 788 | 877 |
| −15° C. | 634 | 720 |

TABLE III-continued saturated vapor pressure of i-$C_3F_7CN$

| Temperatures | $SVP_{i-C3F7CN}$ (hPa) | $P_{i-C3F7CN}$ (hPa) |
|---|---|---|
| −20° C. | 504 | 583 |
| −25° C. | 395 | 466 |
| −30° C. | 305 | 368 |
| −35° C. | 232 | 286 |
| −40° C. | 173 | 218 |

Example of Application and Filling

Depending on the equipment, the recommended pressure for filling with an electric insulation medium and/or an electric arc extinction medium varies. However, it is typically a pressure of several bars (i.e. a few thousand hectopascals).

Heptafluoroisobutyronitrile is used in a mixture with carbon dioxide and various amounts of oxygen in order to be able to obtain the recommended filling pressure level.

Thus, for example, equipment designed firstly for being used at a minimum temperature of −30° C., and secondly for being filled to 5 bars (i.e. 5000 hPa), at an ambient temperature of 20° C., should be filled with 0.368 bars (i.e. 368 hPa) of heptafluoroisobutyronitrile and 4.632 bars (i.e. 4632 hPa) of a dilution gas at that ambient temperature.

Such equipment is in particular high-voltage equipment of the 145 kV (kilovolt) gas-insulated equipment (GIS) type as sold by Alstom under reference B65, designed for an application at −30° C. filled with a dilution gas/i-$C_3F_7CN$. For this equipment having a minimum application temperature of −30° C., heptafluoro-isobutyronitrile should be at a pressure of 0.368 bars absolute measured at 20° C. Buffer gas should be added in order to obtain the final properties of the gas mixture. More particularly, in the context of the present invention, $CO_2$ is added in order to obtain the total pressure of the mixture. Some of the $CO_2$ was replaced by oxygen so as to determine the contribution of oxygen to the total dielectric strength. Various molar ratios of oxygen were tested: 0%, 2%, 4%, 6%, 8%, and 10%.

Since the partial pressure of heptafluoroisobutyronitrile is 0.368 bars absolute measured at 20° C. and the total pressure of the gas is 5 bars absolute, the molar ratio of i-$C_3F_7CN$ is thus 0.368/5, i.e. about 7.4%.

In order to determine the composition of the gas mixture for use during filling, a molar percentage M is determined for heptafluoroisobutyronitrile at the recommended filling pressure of the equipment, which percentage represents the maximum proportion of heptafluoroisobutyronitrile that the mixture of heptafluoroisobutyronitrile/(carbon dioxide+oxygen, if any), should include in order for there not to be any liquid in the enclosure of the equipment. The molar percentage M is given by the formula $M=(P_{he}/P_{mixture}) \times 100$, with $P_{he}$ representing the pressure, at the filling temperature (typically of the order of 20° C.), equivalent to the saturated vapor pressure SVP of heptafluoroisobutyronitrile at the minimum utilization temperature $T_{min}$ of the equipment ($P_{he}=(SVP_{he} \times 293)/(273+T_{min})$).

Then, the molar percentage $M_{he}$ is selected as a function of M. In some circumstances, it is imperative that $M_{he}$ does not exceed M in order to avoid the presence of any liquid.

However, it is sometimes possible, for example at medium voltage or for some high-voltage equipment for which insulation is not affected by the presence of a liquid phase, to have a little liquid at low or very low temperature, and then $M_{he}$ may reach 110% or even 130% of M. In addition, as heptafluoro-isobutyronitrile has better dielectric strength than neutral gases, it is desirable to optimize filling using heptafluoro-isobutyronitrile: therefore, it is preferable for $M_{he}$ to be selected so that it is not less than 80% of M, better still not less than 95% of M, better still not less than 98% of M, e.g. equal to 99% of M.

Example of Filling for 0% Oxygen (Comparative Example)

Since the partial pressure of heptafluoroisobutyronitrile is 0.368 bars absolute measured at 20° C. and the total pressure of the gas is 5 bars absolute, the molar ratio of i-$C_3F_7CN$ is thus 0.368/5, i.e. about 7.4%. To achieve this, additional $CO_2$ was added until a total pressure of 5 bars absolute (4 bars relative) was reached.

The equipment can be filled by adding gases starting with i-$C_3F_7CN$, which presents the lower saturated vapor pressure at the filling temperature (relative to $CO_2$), then by adding $CO_2$ until the total pressure of the mixture (4 bars relative) is reached, or it can be filled by means of a gas mixer enabling the ratio between i-$C_3F_7CN$ and the carrier gas $CO_2$ to be controlled, this ratio being held constant and equal to about 7.4% by pressure for the duration of filling by using a precision mass flowmeter.

Example of Filling for 2% Oxygen (Invention)

Since the partial pressure of heptafluoroisobutyronitrile is 0.368 bars absolute measured at 20° C., firstly, pure $O_2$ at 0.1 bars absolute was added and then $CO_2$ was added until a total pressure of 5 bars absolute (4 bars relative) was reached. The molar ratio of i-$C_3F_7CN$ was thus 0.368/5 i.e. about 7.4%; the molar ratio of $O_2$ was 0.1/5 i.e. 2%; and the molar ratio of $CO_2$ was 4.53/5 i.e. about 90.6%.

The equipment can be filled by adding gases starting with i-$C_3F_7CN$, which presents the lowest saturated vapor pressure at the filling temperature (relative to $CO_2$ and $O_2$), then beginning by adding oxygen for greater accuracy, and then by adding $CO_2$, until the total pressure of the mixture (4 bars relative) is reached, or it can be filled by means of a gas mixer enabling the ratio between i-$C_3F_7CN$ and $O_2$ with $CO_2$, this ratio being held constant and equal to 7.4% by pressure for the duration of filling by using a precision mass flowmeter.

Electric Results: Strength Tests at Power Frequency and Under a Lightning Impact at High Voltage These tests were carried out on a set of busbars of an ALSTOM B65 shielded substation having a rated voltage of 145 kV, in accordance with IEC standard 62271-1 relating to high-voltage equipment.

The Table IV below shows the results obtained for a gaseous medium containing only $CO_2$, only dry air, only $SF_6$, or a mixture of $CO_2$ and of heptafluoroisobutyronitrile ($CO_2/C_3F_7CN$) in a molar ratio of 7.4/92.6, for an identical total pressure, i.e. 4 bars relative.

TABLE IV

| Gaseous medium | Power frequency (kV) | Positive lightning impact (kVc) | Negative lightning impact (kVc) |
|---|---|---|---|
| $CO_2$ | 176 | 366 | −310 |
| Dry air | 211 | 334 | −369 |
| $SF_6$ | 456 | 890 | −889 |
| $CO_2$/i-$C_3F_7CN$ | 367 | 820 | −685 |

In addition, the dielectric strength of the mixtures $CO_2$/i-$C_3F_7CN$ (−30° C.) for various oxygen contents (0% to 10%) were measured:
- at 50 Hz: the minimum striking voltage (Min), the maximum striking voltage (Max), and the mean value over 30 measurements (mean) are given;
- under a lightning impact (negative (LI−) and positive (LI+) polarity): the voltage U50 that represents the voltage at which 50% breakdown takes place, as obtained by the rise and fall method, and the voltage U0, which is a withstand voltage (0% breakdown) are given.

The results are presented below in Table V.

TABLE V

| $C_3F_7CN$ | Bar abs | 0.367 | 0.369 | 0.37 | 0.371 | 0.371 | 0.37 |
|---|---|---|---|---|---|---|---|
| $O_2$ | Bar abs | 0 | 0.105 | 0.207 | 0.308 | 0.405 | 0.506 |
| $CO_2$ | Bar abs | 4.683 | 4.576 | 4.473 | 4.361 | 4.284 | 4.174 |
| Total pressure | Bar abs | 5.05 | 5.05 | 5.05 | 5.04 | 5.06 | 5.05 |
| % $C_3F_7CN$ | % | 7.3% | 7.3% | 7.3% | 7.4% | 7.3% | 7.3% |
| % $O_2$ | % | 0.0% | 2.1% | 4.1% | 6.1% | 8.0% | 10.0% |
| 50 Hz | mean | 367 | 396 | 397 | 408 | 393 | 407 |
| | Min | 286 | 347 | 354 | 355 | 331 | 324 |
| | Max | 410 | 429 | 450 | 437 | 402 | 438 |
| LI+ | U50 | 820 | 869 | 874 | 888 | 880 | 894 |
| | U0 | 780 | 850 | 840 | 840 | 860 | 870 |
| LI− | U50 | −685 | −693 | −701 | −689 | −665 | −710 |
| | U0 | −670 | −680 | −690 | −670 | −650 | −690 |

Figure 3:
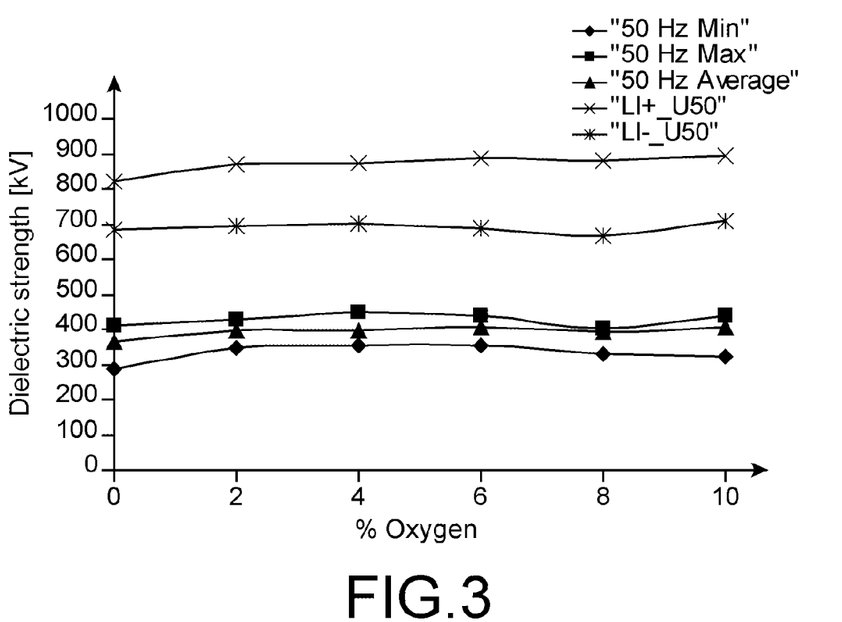
FIG. 3 shows, as a function of oxygen content, the dielectric strength of mixtures comprising heptafluoroisobutyronitrile, carbon dioxide, and oxygen for an application temperature of −30° C.

Using some of the results in Table V, FIG. 3 shows the dielectric strength of the mixtures (i-$C_3F_7CN$+$CO_2$+possibly $O_2$) as a function of the $O_2$ content and for an application temperature of −30° C.

From results shown in Table V, Table VI below shows the relative dielectric strengths relative to the mixture i-$C_3F_7CN$+$CO_2$.

TABLE VI

| | | 0 | 2 | 4 | 6 | 8 | 10 |
|---|---|---|---|---|---|---|---|
| $C_3F_7CN$ | Bar abs | 0.367 | 0.369 | 0.37 | 0.371 | 0.371 | 0.37 |
| $O_2$ | Bar abs | 0 | 0.105 | 0.207 | 0.308 | 0.405 | 0.506 |
| $CO_2$ | Bar abs | 4.683 | 4.576 | 4.473 | 4.361 | 4.284 | 4.174 |
| Total pressure | Bar abs | 5.05 | 5.05 | 5.05 | 5.04 | 5.06 | 5.05 |
| % $C_3F_7CN$ | % | 7.3% | 7.3% | 7.3% | 7.4% | 7.3% | 7.3% |
| % $O_2$ | % | 0.0% | 2.1% | 4.1% | 6.1% | 8.0% | 10.0% |
| 50 Hz | mean | 1.00 | 1.08 | 1.08 | 1.11 | 1.07 | 1.11 |
| | Min | 1.00 | 1.21 | 1.24 | 1.24 | 1.16 | 1.13 |
| | Max | 1.00 | 1.05 | 1.10 | 1.07 | 0.98 | 1.07 |
| LI+ | U50 | 1.00 | 1.06 | 1.07 | 1.08 | 1.07 | 1.09 |
| | U0 | 1.00 | 1.09 | 1.08 | 1.08 | 1.10 | 1.12 |
| LI− | U50 | 1.00 | 1.01 | 1.02 | 1.01 | 0.97 | 1.04 |
| | U0 | 1.00 | 1.01 | 1.03 | 1.00 | 0.97 | 1.03 |

Using some of the results in Table VI, FIG. 4 shows the relative dielectric strength of the mixtures (i-$C_3F_7CN$+$CO_2$+possibly $O_2$) compared with a mixture (i-$C_3F_7CN$+$CO_2$) as a function of $O_2$ content and for an application temperature of −30° C.

An improvement in the dielectric properties of the mixtures is observed starting from the addition of 2% oxygen, in particular for the dielectric strength values: the minimum breakdown value at 50 Hz and the lightning impact value U0 especially in positive polarity, the improvement being smaller in negative polarity.

The improvement in the dielectric properties is observed for an oxygen content of 2% to 10% with optimum dielectric properties for the addition of 2% to 6%, and a central value of 4%.

In this context, the dielectric strengths of the reference gases ($CO_2$, $N_2$, $SF_6$, $CO_2$/i-$C_3F_7CN$) and of the $CO_2$/i-$C_3F_7CN$/4 v % $O_2$ mixture for an application temperature of −30° C. at power frequency were measured at power frequency as well as under a positive or a negative wave lightning impact in accordance with IEC standard 62271-1 in the same configurations (GIS 145 kV sold under Alstom reference B65 designed for application at −30° C.) The results are presented below in Table VII.

TABLE VII

| | $CO_2$ | $N_2$ | $CO_2$/ i-$C_3F_7CN$ (−30° C.) | $CO_2$/ i-$C_3F_7CN$/4% $O_2$ (−30° C.) | $SF_6$ |
|---|---|---|---|---|---|
| Power frequency (kV) | 176 | 211 | 367 | 397 | 456 |
| Positive lightning impact (kVc) | 366 | 334 | 820 | 874 | 890 |
| Positive lightning impact (kVc) | −310 | −369 | −685 | −701 | −889 |

The addition of 4% oxygen makes it possible to improve in a significant manner the dielectric strength of the total gas mixture at power frequency and under lightning impact (positive and negative polarities) and to reach 87% of the strength of $SF_6$ in the equipment at 50 Hz, 98% under positive polarity lightning impact, and 78% under negative polarity lightning impact.

Toxicity

Heptafluoroisobutyronitrile presents no specific toxicity for humans and has an LC50 (lethal concentration, 50%) that is greater than 15,000 ppm. In addition, by diluting it to about 7% in $CO_2$ or in air, toxicity is further reduced by the molar or volume ratio of the mixture in order to reach an LC50 of the order of 70,000 ppm for the mixture, which classifies it in the field of gases considered to be "practically non-toxic" (toxicity classification 5, according to the Hodge and Sterner toxicity scale).

Flammability

Pure heptafluoroisobutyronitrile, as well as the i-$C_3F_7CN$/$CO_2$ mixtures having a low oxygen content are non-flammable.

Environmental Impact/GWP

The global warming potential or GWP of heptafluoroisobutyronitrile is of the order of 2400, i.e. 9.5 times lower than that of $SF_6$ and more than 3.1 times lower than that of a mixture of $SF_6$ and nitrogen at 10% by volume of $SF_6$.

Heptafluoroisobutyronitrile presents a molar mass of 195 grams per mole (g/mol).

The GWP of the gas mixture is calculated in accordance with the May 17, 2006 Regulation (EC) No. 842/2006 of the European Parliament and of the Council on certain fluorinated greenhouse gases, Part 2 "Method of calculating the total global warming potential (GWP) for a preparation". According to that text, the GWP factor of a gas mixture is a weighted average, using the weight fraction of each substance multiplied by its GWP factor.

In use in a mixture at 7.4% molar percent in $CO_2$ (44 g/mol) plus oxygen at 4%, the fraction by weight of heptafluoro-isobutyronitrile is 26%, therefore the GWP of the mixture is of the order of 630, which represents a reduction of the order of 97.2% compared with the carbon equivalent for pure $SF_6$ (Table VIII).

TABLE VIII

| Gas | Molar mass | GWP | P (bar abs) | molar % (% P) | Weight fraction (w %) |
|---|---|---|---|---|---|
| i-$C_3F_7CN$ | 195 | 2400 | 0.37 | 7.40% | 26.21% |
| $O_2$ | 32 | 0 | 0.207 | 3.71% | 2.16% |
| $CO_2$ | 44 | 1 | 5 | 89.65% | 71.64% |
| Total P | | | 6 | | |

GWP of mixture = 630
Reduction/$SF_6$ = 97.2%

End of Life

At the end of its life or after circuit-breaking tests, the gas can be recovered by means of conventional recovery techniques using a compressor and a vacuum pump. The heptafluoroisobutyronitrile is then separated from the carbon dioxide and oxygen using a zeolite capable of trapping only the smaller-sized carbon dioxide and the oxygen; alternatively, a selective separation membrane allows the carbon dioxide and the oxygen to escape and retains the heptafluoroisobutyronitrile, which has greater size and molar mass; any other option may be envisaged.

Association with Solid Insulation

So as to obtain dielectric equivalence with $SF_6$, (reaching 100% of the strength of $SF_6$), without reducing its performance at low temperature or increasing the total amount of pressure, the gas mixture presented above is used in combination with solid insulation having low dielectric permittivity that is applied on those conductive parts that are subjected to an electric field that is greater than the breakdown field of the system without solid insulation.

The solid insulation implemented in the context of the present invention is in the form of a layer of thickness that varies for a given piece of equipment. The implemented insulating layer may present low thickness (thin or fine layer), or high thickness (thick layer).

Since the thickness of the insulating layer is a function of the utilization factor of the electrical field, $\eta$, defined as the ratio of the mean electric field (U/d) divided by the maximum electric field Emax ($\eta=U/(Emax*d)$), the layer is thick for utilization factors close to 0.3, and the layer is thin for utilization factors approaching 0.9.

Figure 5:
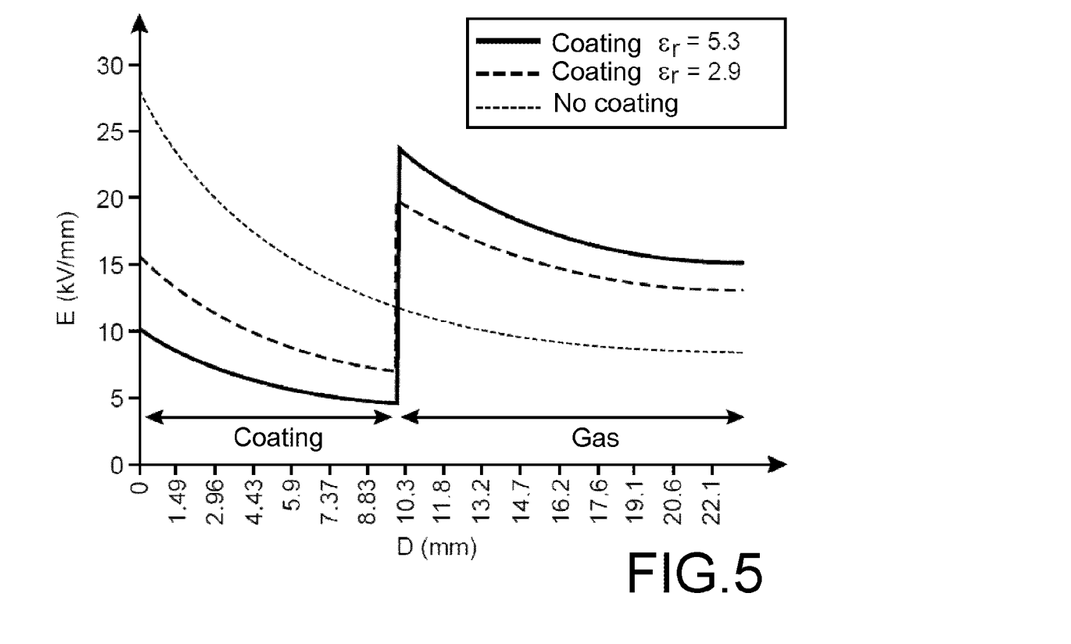
FIG. 5 shows the profile of the electric field in the solid insulating layer and the gaseous phase for relative permittivities of 2.9 and 5.3.

The calculations presented in FIG. 5 call attention to the reduction of the maximum electric field to which the insulation gas is subjected for mixed insulation combining solid insulation applied in a layer on the parts subjected to high electric fields, typically at the electrodes.

This solution therefore makes it possible to reduce, in significant manner, the maximum electric field on the gaseous phase and thus to increase the total dielectric strength of the "mixed" insulation that is made up in series of solid insulation and of gas insulation. This phenomenon of reducing the electrical field acting on the gaseous phase is more pronounced when the dielectric permittivity of the solid layer is low.

In the example presented, the hybrid insulation is composed of solid spherical insulation of a thickness of 10 mm in combination with gas insulation of a thickness of 15 mm, the total insulation being of a thickness of 25 mm. Electric field calculation was performed for two different configurations of solid insulation presenting significantly different relative permittivities, typically of 5.3 and 2.9.

In this precise example, the factor by which the electric field in the gaseous phase is reduced is of the order of 15% for solid insulation having dielectric permittivity of 5.3 and of the order of 30% for solid insulation having dielectric permittivity of 2.9. In the invention, a material presenting relative permittivity of the order of 3 or less is preferred for making the thick layers in the electrodes.

These dielectric calculations have been confirmed by measurements performed on equipment presenting an improvement factor of the order of 20% in dielectric strength (relative to a non-covered electrode) for a thick layer made of epoxy resin presenting relative permittivity of the order of 5 and an improvement factor of the order of 30% (relative to a non-covered electrode) in dielectric strength for a thick layer made of silicone presenting relative permittivity of the order of 3.

For the thin layers made on the electrical parts subjected to weaker electric fields, the materials used present dielectric permittivities of the order of 3 and they are applied in the form of thin layers having thickness that is typically of the order of 60 to 100 μm. The results obtained using equipment with thin layer deposits of the order of 60 to 100 μm of Nuflon™ (relative permittivity of 2.7) or parylene N (relative permittivity of 2.65) deposited on electrodes show improvement factors for dielectric strength of the order of 8% relative to a non-covered electrode.

Figure 6:
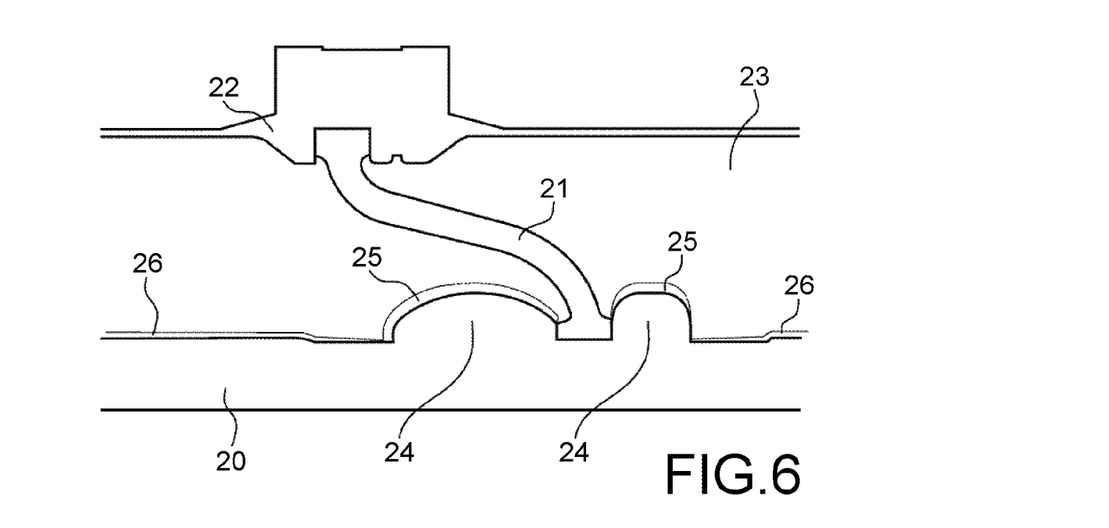
FIG. 6 is a diagrammatic view of a portion of equipment of the present invention.

In the context of the present invention, the equipment that is shown in part in a diagram in FIG. 6 has a metal enclosure (22) with an insulator (21) and electrical components including a conductor (20) and electrodes (24). In said equipment, the hybrid insulation is constituted both by gas insulation consisting of a gas mixture (23) under pressure of heptafluoro-isobutyronitrile, of $CO_2$, and of $O_2$ as defined above and by solid insulation present in the form of a thick dielectric layer (25) or of a thin dielectric layer (26) as defined above.

The combination of the two technologies in one hybrid insulation, comprising both gas-insulation of the $CO_2$/i-$C_3F_7CN$/$O_2$ type and in particular $O_2$ at 4 v % together with a solid insulation in the form of a thick layer at locations having a weak field utilization factor and in the form of a thin layer at locations having a strong field utilization factor, makes it possible to obtain total insulation equivalent to that of $SF_6$ without any significant increase in pressure and without modifying the minimum utilization temperature.

REFERENCES

[1] European patent application, in the name of Mitsubishi Denki Kabushiki Kaisha, having publication number 0 131 922 on Jan. 23, 1985.
[2] U.S. Pat. No. 4,547,316, in the name of Mitsubishi Denki Kabushiki Kaisha, published on Oct. 15, 1985.
[3] International application WO 2008/073790, in the name of Honeywell International Inc., published on Jun. 19, 2008.
[4] International application WO 2012/080246, in the name of ABB Technology AG., published on Jun. 21, 2012.
[5] European patent application, in the name of Mitsubishi Denki Kabushiki Kaisha, having publication number 1 724 802 on Nov. 22, 2006.

What is claimed is:

1. Medium- or high-voltage equipment including a leaktight enclosure in which there are located electrical components and a gas mixture for providing electrical insulation and/or for extinguishing electric arcs that are likely to occur in said enclosure, wherein the gas mixture consists of heptafluoroisobutyronitrile, carbon dioxide, and oxygen, the oxygen being present in said gaseous medium at a molar percentage lying in the range 1% to 25%.

2. Equipment according to claim 1, wherein the oxygen is present in said gas mixture at a molar percentage lying in the range 2% to 15% and, in particular, in the range 2% to 10%.

3. Equipment according to claim 1, wherein said heptafluoroisobutyronitrile is present in said gas mixture at a molar percentage ($M_{he}$) that is not less than 80% of the molar percentage M, determined by formula (II):

$$M = (P_{he}/P_{mixture}) \times 100 \quad (II)$$

in which $P_{mixture}$ represents the total pressure of the mixture at 20° C. in the equipment and $P_{he}$ represents the partial pressure, expressed in the same units, that is equivalent at 20° C. to the saturated vapor pressure presented by heptafluoro-isobutyronitrile as defined above at the minimum utilization temperature of the equipment.

4. Equipment according to claim 1, wherein said heptafluoroisobutyronitrile is present in said gas mixture at a molar percentage ($M_{he}$) that lies in the range 95% to 130%, better still in the range 97% to 120%, ideally in the range 99% to 110% of the molar percentage M, determined by formula (II):

$$M = (P_{he}/P_{mixture}) \times 100 \quad (II)$$

in which $P_{mixture}$ represents the total pressure of the mixture at 20° C. in the equipment and $P_{he}$ represents the partial pressure, expressed in the same units, that is equivalent at 20° C. to the saturated vapor pressure presented by heptafluoroisobutyronitrile as defined above at the minimum utilization temperature of the equipment, said equipment being medium-voltage or high-voltage equipment in which having some of the mixture in the liquid state does not reduce insulation.

5. Equipment according to claim 1, wherein said heptafluoroisobutyronitrile is present in said gas mixture at a molar percentage ($M_{he}$) that lies in the range 95% to 100%, in particular in the range 98% to 100% of the molar percentage M, determined by formula (II):

$$M = (P_{he}/P_{mixture}) \times 100 \quad (II)$$

in which $P_{mixture}$ represents the total pressure of the mixture at 20° C. in the equipment and $P_{he}$ represents the partial pressure, expressed in the same units, that is equivalent at 20° C. to the saturated vapor pressure presented by heptafluoroisobutyronitrile as defined above at the minimum utilization temperature of the equipment, said equipment being medium-voltage or high-voltage equipment in which insulation may be affected by the presence of a liquid phase.

6. Equipment according to claim 1, wherein electrical components covered in a solid dielectric layer of varying thickness are located inside said leaktight enclosure.

7. Equipment according to claim 6, wherein, the thickness of said solid dielectric layer is a function of the utilization factor of the electric field, η, defined as the ratio of the mean electric field (U/d) divided by the maximum electric field Emax (η=U/(Emax*d)), and said solid dielectric layer is a thick layer presenting a thickness greater than 1 mm and less than 10 mm for utilization factors lying in the range 0.2 to 0.4.

8. Equipment according to claim 7, wherein the material(s) selected for making said thick solid dielectric layer present(s) relative permittivity that is less than or equal to 6.

9. Equipment according to claim 7, wherein the material(s) selected for making said thick solid dielectric layer present(s) relative permittivity that is less than or equal to 4 and in particular less than or equal to 3.

10. Equipment according to claim 8, wherein said material(s) are selected from: polytetrafluoroethylene, polyimide, polyethylene, polypropylene, polystyrene, polycarbonate, polymethyl methacrylate, polysulfone, polyetherimide, polyether ether ketone, parylene N™, Nuflon™, silicone, and epoxy resin.

11. Equipment according to claim 6, wherein the thickness of said solid dielectric layer is a function of the utilization factor of the electric field, η, defined as the ratio of the mean electric field (U/d) divided by the maximum electric field, Emax (η=U/(Emax*d)), and said solid dielectric layer is a thin layer presenting a thickness less than 1 mm, advantageously less than 500 μm, in particular lying in the range 60 to 100 μm for utilization factors greater than 0.5, and in particular greater than 0.6.

12. Equipment according to claim 11, wherein the material(s) selected for making said thin solid dielectric layer present relative permittivity lying in the range 2 to 4 and in particular in the range 2.5 to 3.5.

13. Equipment according to claim 11, wherein said material(s) is/are selected from polytetrafluoroethylene, polyimide, polyethylene, polypropylene, polystyrene, polyamide, ethylene-monochlorotrifluoroethylene, parylene N™, Nuflon™, HALAR™, and HALAR C™.

14. Equipment according to claim 1, wherein said equipment is a gas-insulated electrical transformer, a gas-insulated line for transporting or distributing electricity, an element for connecting to other pieces of equipment in the network, or a connector/disconnector.

15. A method for electrical insulation and/or for electric arc extinction comprising a step of utilizing equipment according to claim 6.

* * * * *